Oct. 19, 1937.  C. W. HANSELL  2,095,981

TEMPERATURE COMPENSATING SYSTEM

Filed June 1, 1935

INVENTORS
C. W. HANSELL
BY H. S. Grover
ATTORNEY

Patented Oct. 19, 1937

2,095,981

UNITED STATES PATENT OFFICE 2,095,981

TEMPERATURE COMPENSATING SYSTEM

Clarence W. Hansell, Port Jefferson, N. Y., assignor to Radio Corporation of America, a corporation of Delaware Application June 1, 1935, Serial No. 24,510

15 Claims. (Cl. 250—36)

Resonant line controlled oscillation generators such as described in my copending application Serial No. 692,092 filed October 4, 1933, of which this is a continuation in part, have proven especially successful for the production of short waves of constant frequency. Nevertheless, as the temperature of the line changes due both to ambient temperature conditions and to losses in the line as the oscillator is started up, the length of the line, which is usually made of a metal such as copper, changes, producing a change in the frequency or wave length of oscillations produced. As this effect is undesirable, the principal object of the present invention is to provide a simple, inexpensive and efficient system and apparatus for maintaining constant the effective electrical length of a resonant frequency controlling line despite any variations in temperature of the line which may occur.

Briefly, in carrying out this object, a section of metallic pipe is run parallel to the line and this pipe is filled with oil or some other liquid having a high temperature coefficient of expansion. At the end of this parallel pipe, container or tube, there is mounted, preferably, a metallic bellows the end of which will move back and forth as the temperature of the oil varies and this movement is used to actuate a condenser plate or, in a modification, to actually vary the length of the resonant line itself to compensate for changes in temperature. In connection with this apparatus a container containing the fluid may be connected with the pipe and this additional container may be placed closely adjacent to a portion of the frequency controlling line. By varying the exposure of this container to the line and by varying the exposure of the fluid filled pipe to the room, proper thermal coupling to room temperature and to the temperature of the resonant frequency line may be obtained and will adjust and compensate the effective length of the line for both room temperatures and temperature changes due to losses in the line itself.

The invention is more fully described in connection with the accompanying drawing in which.

Figure 1:
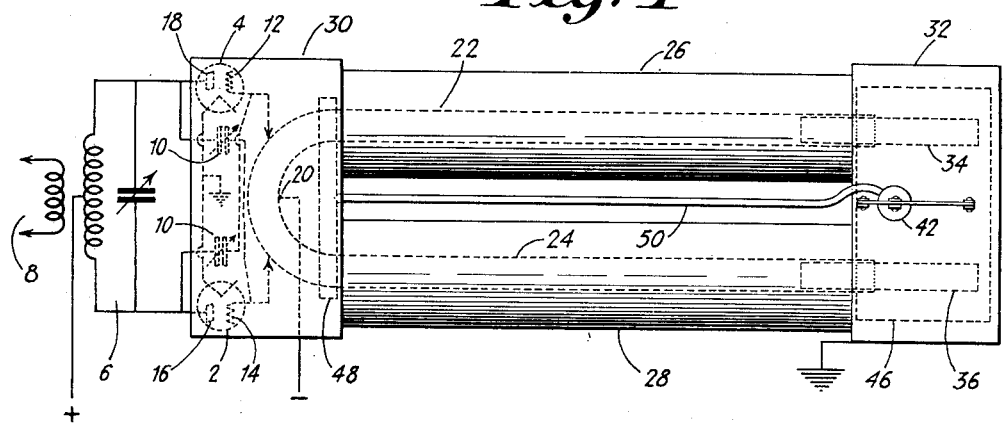
Fig. 1 is a top plan view of a resonant line controlled push-pull oscillation generator employing the temperature compensating system to be described more fully hereinafter.

Turning to Figs. 1 and 2 in which, as explained above, Fig. 2 is a partial side elevational view of Fig. 1, there is illustrated a push-pull connected oscillation generator which is controlled as to frequency by a resonant U-shaped transmission line such as described in greater detail in the copending application of C. W. Hansell, Serial No. 692,092 filed October 4, 1933. The oscillation generator includes a pair of electron discharge devices 2, 4 provided with a tunable plate circuit 6 and inductively coupled utilization or output circuit 8. The grids 12, 14 and anodes 16, 18 are cross-connected by the feedback condensers 10, 15 and the grids 12, 14, as illustrated are symmetrically connected to the U-shaped transmission lines 22, 20, 24 about the electrical center 20 thereof. The lines 22, 24 are provided with metallic shielding cylinders 26, 28 in turn facing into metallic housing portions 30, 32. If desired, the metal box 30 may contain the oscillator tubes 2, 4. Telescoped into the far ends of the lines 22, 24 are the tube sections 34, 36 which may be adjusted so that the overall length of line is effectively one-half wave length long at a desired operating radio frequency, or any desired length.

Despite the fact that the system so far described produces short wave oscillations of very constant frequency, temperature changes occurring in the line produce undesired wave length variations. The temperature of the line varies, generally, for two reasons. When the system is started up the high frequency oscillations produce heating of the line and, moreover, produce heating in the line which may cause, in some instances, a downward shift of about .015% in frequency due to the rise in temperature caused by the losses within the line. Moreover, tests have shown that there is a change in frequency of about .00135% per degree Centigrade change in room temperature. This change in frequency is primarily due to the fact that the line lengthens with increase in temperature. This increase in length of line decreases the oscillating frequency and, should the room temperature cause the line to contract, there would be an increase in oscillating frequency.

To prevent these changes in frequency with variations in temperature I have provided a system which acts to change the effective electrical length of the frequency controlling line in such a way that the oscillations generated remain constant despite ambient or other temperature changes about and in the frequency controlling resonant line. This system includes the T-shaped fluid filled container 48, 50, the expansible and contractible bellows 42, the leverage system 38, 40, 44 and the movable, preferably hinged condenser element or grounded condenser plate 46. The pipe 50 as well as its T-shaped terminating end 48 is preferably filled with oil, sealed and arranged as shown so that the end 48 is close to the line and so that a portion of the system as illustrated by the pipe 50 is exposed to the room temperature.

Figure 2:
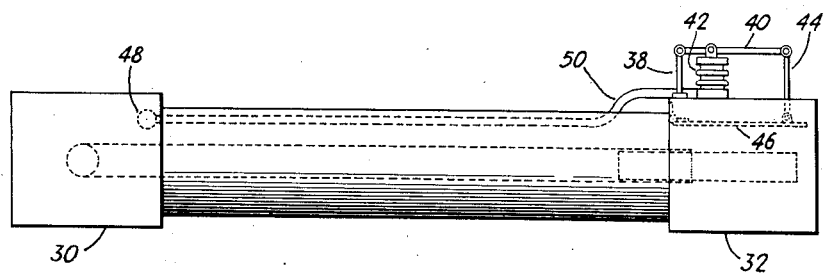
Fig. 2 is a partial side elevational view of Fig. 1.

The oil in the pipe having a relatively very large temperature coefficient of expansion will change its volume with change of temperature and so cause movement of the bellows 42, levers 40 and 44 and in turn vary the capacity between condenser plate 46 and the ends 34, 36 of the frequency controlling resonant U-shaped transmission line. With increase in temperature the plate 46 will be moved away from the ends of the line 34, 36 thereby decreasing the capacity of the line to ground and thereby compensating for an increase in length of the line with increase in temperature. Either the plate 46 or the housing 32 may be grounded, and plate 46 may be hinged and connected to housing 32, as shown in Fig. 2. The line is, of course, insulatingly positioned with respect to the plate 46, housings 30, 32, and cylinders 26, 28. Conversely, with a decrease in temperature of the line, the capacity between plate 46 and the line is increased, effectively causing an increase in length of the line as it physically shortens with decrease in temperature.

By exposing part of the system 48, 50 to the room and keeping the part 48 close to the line, the frequency of oscillation is made relatively independent of both room temperature and also of losses occurring in the line. That is to say, by correct exposure to room temperature and other disturbing temperature variations, the oil in the pipe may be used to correct all of these variations quite closely.

Figure 3:
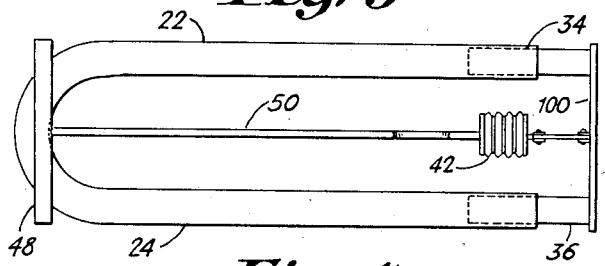
Figs. 3, 4 and 5 are partial schematic showings of modifications in which my temperature compensating system adjusts the actual length of a resonant frequency controlling transmission line.
Figure 4:
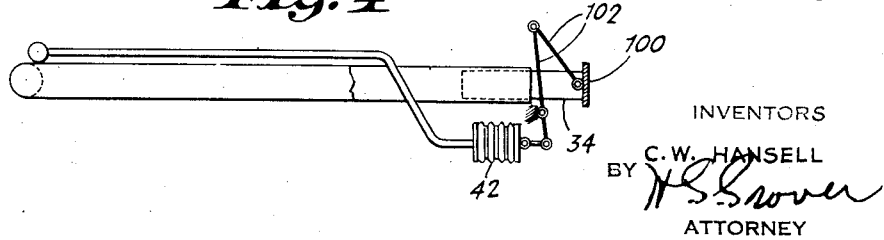

If desired, the temperature controlling system 48, 50, 62 as shown in plan in Fig. 3 and in elevation in Fig. 4 may be used to directly affect the length of the line in such a way as to maintain frequency constant despite changes in temperature of the line. As shown diagrammatically in Fig. 3 and in Fig. 4, the bellows 42 expands and contracts against lever system 102 in such a way that with increase in temperature the insulating bar 100 is moved to the left and with decrease in temperature or contraction of bellows 42, the insulating bar 100 carrying the telescoped ends 34, 36 is moved to the right. In this way, the fluid within the pipe 50 automatically maintains the length of the line constant despite change in temperature.

Figure 5:
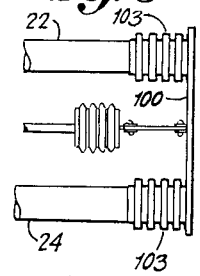

A preferred way of altering the length of the line is shown in Fig. 5. Instead of using sliding parts as shown in Figs. 3 and 4, there are attached to the ends of the line 22 (Fig. 5) metallic bellows 103 which are expanded and compressed with changes in temperature by the oil pipe and lever system 48, 50, 42, 102 of Figs. 3 and 4, which system, for the sake of simplicity has been omitted from Fig. 5. The arrangement of Fig. 5 is particularly sensitive and efficient.

Obviously, our temperature controlling system may be put to other uses than that described and also there may be various minor changes in the apparatus illustrated and described without departing from the spirit and scope of my present invention.

Having thus described my invention what I claim is:

1. In a high frequency communication system, the combination of a fluid filled tube, a tuning means and a movable element cooperating therewith to change its frequency, and means responsive to the expansion of the fluid in said tube to move said element.

2. In a high frequency communication system, a fluid filled tube, a tuning means and a movable element cooperating therewith to change its frequency, and means directly mechanically responsive to variations in volume of said fluid with variations in temperature for moving said element.

3. In a high frequency communication system, a fluid filled T-shaped container and expansible bellows fixed to the foot end of said T-shaped container, said bellows expanding upon expansion of the fluid within said container and, a tuning means, an element cooperating with said tuning means and mechanically connected to said bellows and movable with the expansions and contractions of said bellows for controlling the frequency of said system.

4. In combination, in a system employing alternating currents, an electrical circuit of variable length for determining the frequency of said alternating currents, a fluid filled tube substantially parallel to a dimension of said circuit, and means mechanically responsive to the expansion of the fluid in said tube for compensating for variations in frequency of said currents due to variations in said dimension of said circuit.

5. In high frequency apparatus, a resonant transmission line, a fluid filled tube, and means directly mechanically responsive to the expansions and contractions in the volume of fluid in said tube to maintain the length of said line electrically constant.

6. Apparatus in accordance with claim 5, characterized by the fact that said means includes a grounded condenser plate forming a capacitance with said line and movable with respect to said line.

7. A temperature controlled oscillation generator comprising an electron discharge device, a resonant transmission line connected to electrodes thereof for controlling the frequency of oscillations produced by said device, and a fluid filled tube having means responsive to the expansion of the fluid in said tube for varying the effective length of said line with variations in temperature.

8. A temperature controlled oscillation generator comprising a pair of push-pull connected electron discharge devices, a U-shaped transmission line connected to the control grids thereof for fixing the frequency of oscillations produced by said devices, a fluid filled tube arranged adjacent said U-shaped line and means responsive to the expansions and contractions of the fluid within said tube for adjusting the effective electrical length of said line in a desired way with variations in temperature of said line.

9. A temperature controlled oscillation generator comprising a pair of push-pull connected electron discharge devices a U-shaped resonant transmission line for controlling the frequency of oscillations generated by said device connected to the control grids of said devices, a capacitive element in circuit with said line for changing the effective electrical length thereof, a T-shaped fluid filled tube adjacent said line and so constructed and arranged that the temperature of the fluid within said tube is partially dependent upon the heating of said line due to oscillatory currents flowing therein and partially due to ambient room temperatures, an expansible and contractible device communicating with said tube expanding and contracting in response to the expansions and contractions of the fluid within the tube due to changes in temperature thereof, and means mechanically coupled to said expansible and contractible device for moving said capacitive element in response to the expansions and contractions thereof.

10. In high frequency apparatus, a resonant transmission line, a fluid filled tube, and means responsive to the expansions and contractions in the volume of fluid in said tube to maintain the length of said line electrically constant.

11. In high frequency apparatus, a resonant transmission line, an oil filled tube, and means responsive to the expansions and contractions in the volume of oil in said tube to maintain the length of said line electrically constant.

12. In a high frequency communication system, the combination of an oil filled tube, a tuning means and a movable element cooperating therewith for controlling the frequency of said system, and means responsive to the expansion of the oil in said tube to move said element.

13. In high frequency apparatus, a resonant transmission line, a fluid filled tube, and a bellows coupled to said line and responsive to the expansions and contractions in the volume of fluid in said tube to maintain the length of said line electrically constant.

14. In a high frequency system, a frequency controlling element having a dimension variable in response to temperature variations, a fluid filled tube, and means responsive to the expansions and contractions in the volume of the fluid in said tube for physically changing the length of said dimension for compensating for the change in frequency in said system caused by the change in said dimension.

15. In a high frequency system, a low loss resonant line comprising inner and outer concentric conductors resonant to a predetermined frequency, a frequency determining element coupled to said inner conductor, and a sylphon bellows responsive to variations in temperature for controlling said element for compensating for changes in length of said inner conductor, whereby the resonant frequency of said line is maintained substantially constant.

CLARENCE W. HANSELL.